US012589494B2

(12) United States Patent
Li et al.

(10) Patent No.: US 12,589,494 B2
(45) Date of Patent: Mar. 31, 2026

(54) TECHNIQUES FOR CONTROLLING ROBOTS USING DYNAMIC GAIN TUNING

(71) Applicant: AUTODESK, INC., San Francisco, CA (US)

(72) Inventors: Hui Li, San Rafael, CA (US); Xiang Zhang, Albany, CA (US)

(73) Assignee: AUTODESK, INC., San Francisco, CA (US)

( * ) Notice: Subject to any disclaimer, the term of this patent is extended or adjusted under 35 U.S.C. 154(b) by 99 days.

(21) Appl. No.: 18/443,209

(22) Filed: Feb. 15, 2024

(65) Prior Publication Data

US 2025/0091201 A1 Mar. 20, 2025

Related U.S. Application Data

(60) Provisional application No. 63/582,803, filed on Sep. 14, 2023.

(51) Int. Cl.
*B25J 9/16* (2006.01)
*G05B 19/042* (2006.01)

(52) U.S. Cl.
CPC ............. *B25J 9/163* (2013.01); *B25J 9/1633* (2013.01); *B25J 9/1664* (2013.01)

(58) Field of Classification Search
CPC ........ B25J 9/163; B25J 9/1633; B25J 9/1664; G05B 2219/39298; G05B 19/0426; G06N 3/008; G06N 3/045; G06N 3/092; G06N 3/048

USPC ................. 700/245–264; 318/568.11–568.25
See application file for complete search history.

(56) References Cited

U.S. PATENT DOCUMENTS

| | | | | |
|---|---|---|---|---|
| 10,481,566 | B2 * | 11/2019 | Sonoda ................. | G05B 13/027 |
| 10,895,852 | B2 * | 1/2021 | Uno ........................ | G05B 11/42 |
| 10,981,270 | B1 * | 4/2021 | Pastor Sampedro .. | B25J 9/0084 |
| 11,775,860 | B2 * | 10/2023 | Singh ...................... | G06N 3/006 |
| | | | | 706/14 |
| 11,947,343 | B1 * | 4/2024 | Zia .................... | G05B 19/41805 |
| 2018/0284702 | A1 * | 10/2018 | Sonoda ................. | G05B 13/027 |
| 2019/0196417 | A1 * | 6/2019 | Uno ........................ | G05B 11/42 |
| 2020/0311613 | A1 * | 10/2020 | Ma .......................... | G06N 20/20 |
| 2021/0276187 | A1 * | 9/2021 | Tang ...................... | B25J 9/1664 |
| 2022/0105626 | A1 * | 4/2022 | Luo ........................ | G05B 17/02 |
| 2023/0256595 | A1 * | 8/2023 | Murali ................... | B25J 9/1666 |
| | | | | 700/253 |
| 2024/0259702 | A1 * | 8/2024 | Moeys ................... | H04N 23/60 |
| 2024/0346002 | A1 * | 10/2024 | Abdelaal .............. | G06F 16/215 |

OTHER PUBLICATIONS

Inoue et al., "Deep Reinforcement Learning for High Precision Assembly Tasks", arXiv:1708.04033, Sep. 22, 2017, 7 pages.
(Continued)

*Primary Examiner* — Jaime Figueroa
(74) *Attorney, Agent, or Firm* — Artegis Law Group, LLP

(57) ABSTRACT

One embodiment of a method for controlling a robot includes generating, via a first trained machine learning model, a robot motion and a predicted force associated with the robot motion, determining, via a second trained machine learning model, a gain associated with the predicted force, generating one or more robot commands based on the robot motion and the gain, and causing a robot to move based on the one or more robot commands.

20 Claims, 7 Drawing Sheets

(56) References Cited

OTHER PUBLICATIONS

Zhang et al., "Learning Insertion Primitives with Discrete-Continuous Hybrid Action Space for Robotic Assembly Tasks", arXiv:2110.12618, Oct. 25, 2021, 7 pages.

Vuong et al., "Learning Sequences of Manipulation Primitives for Robotic Assembly", arXiv:2011.00778, Mar. 26, 2021, 7 pages.

Luo et al., "Reinforcement Learning on Variable Impedance Controller for High-Precision Robotic Assembly", arXiv:1903.01066, Mar. 20, 2019, 8 pages.

Zhou et al., "Learning to Grasp the Ungraspable with Emergent Extrinsic Dexterity", ICRA, 2022, 9 pages.

Zhang et al., "Learning Generalizable Pivoting Skills", arXiv:2305.02554, May 4, 2023, 7 pages.

Stüber et al., "Let's Push Things Forward: A Survey on Robot Pushing", Frontiers in Robotics and AI, doi: 10.3389/frobt.2020.00008, vol. 8, Article 6, Feb. 6, 2020, pp. 1-18.

Hausman et al., "Learning an Embedding Space for Transferable Robot Skills", ICLR, 2018, pp. 1-16.

Parmar et al., "Fundamental Challenges in Deep Learning for Stiff Contact Dynamics", arXiv:2103.15406, Mar. 29, 2021, 8 pages.

Beltran-Hernandez et al., "Variable Compliance Control for Robotic Peg-in-Hole Assembly: A Deep-Reinforcement-Learning Approach", Applied Sciences, doi: 10.3390/app10196923, vol. 10, Oct. 2, 2020, pp. 1-17.

Seo et al., "Robot Manipulation Task Learning by Leveraging SE(3) Group Invariance and Equivariance", IEEE Robotics and Automation Letters, arXiv:2308.14984, Aug. 29, 2023, 8 pages.

Buchli et al., "Learning Variable Impedance Control", International Journal of Robotics Research, Nov. 16, 2011, pp. 1-22.

Peternel et al., "Human-in-the-Loop Approach for Teaching Robot Assembly Tasks Using Impedance Control Interface", IEEE International Conference on Robotics and Automation, DOI: 10.1109/ICRA.2015.7139387, Jun. 2015, 7 pages.

Abu-Dakka et al., "Force-based Learning of Variable Impedance Skills for Robotic Manipulation", DOI: 10.1109/HUMANOIDS.2018.8624938, Nov. 2018, 9 pages.

Zhang et al., "Learning Variable Impedance Control via Inverse Reinforcement Learning for Force-Related Tasks", arXiv:2102.06838, Feb. 13, 2021, 8 pages.

Rey et al., "Learning Motions from Demonstrations and Rewards with Time-Invariant Dynamical Systems Based Policies", 2018, pp. 1-20.

Wu et al., "Prim-LAfD: A Framework to Learn and Adapt Primitive-Based Skills from Demonstrations for Insertion Tasks", arXiv:2212.00955, Dec. 2, 2022, 6 pages.

Martín-Martín et al., "Variable Impedance Control in End-Effector Space: An Action Space for Reinforcement Learning in Contact-Rich Tasks", arXiv:1906.08880, Aug. 2, 2019, 8 pages.

Chitnis et al., "Efficient Bimanual Manipulation Using Learned Task Schemas", arXiv:1909.13874, Feb. 27, 2020, 7 pages.

Tang et al., "IndustReal: Transferring Contact-Rich Assembly Tasks from Simulation to Reality", arXiv:2305.17110, May 26, 2023, 20 pages.

Handa et al., "DeXtreme: Transfer of Agile In-hand Manipulation from Simulation to Reality", arXiv:2210.13702, Jan. 2, 2024, 28 pages.

Andrychowicz et al., "Learning Dexterous In-Hand Manipulation", The International Journal of Robotics Research, DOI: 10.1177/0278364919887447, vol. 39, No. 1, 2020, pp. 3-20.

Schoettler et al., "Meta-Reinforcement Learning for Robotic Industrial Insertion Tasks", arXiv:2004.14404, May 23, 2020, 9 pages.

Luo et al., "Dynamic Experience Replay", 3rd Conference on Robot Learning, 2019, pp. 1-10.

Spector et al., "Deep Reinforcement Learning for Contact-Rich Skills Using Compliant Movement Primitives", arXiv:2008.13223, Oct. 25, 2020, pp. 1-27.

Luo et al., "A Learning Approach to Robot-Agnostic Force-Guided High Precision Assembly", arXiv:2010.08052, Aug. 2, 2021, 7 pages.

Wu et al., "Zero-Shot Policy Transfer with Disentangled Task Representation of Meta-Reinforcement Learning", arXiv:2210.00350, Oct. 1, 2022, 7 pages.

Chebotar et al., "Closing the Sim-to-Real Loop: Adapting Simulation Randomization with Real World Experience", arXiv:1810.05687, Mar. 5, 2019, 10 pages.

Ljung, Lennart, "System Identification", Apr. 27, 1997, 68 pages.

Song et al., "Impedance Control of Robots: An Overview", 2nd International Conference on Cybernetics, Robotics and Control, DOI 10.1109/CRC.2017.20, 2017, pp. 51-55.

Lin et al., "Robot Learning from Human Demonstration with Remote Lead Through Teaching", European Control Conference, Jun. 29-Jul. 1, 2016, pp. 388-394.

Kozlovsky et al., "Reinforcement Learning of Impedance Policies for Peg-in-Hole Tasks: Role of Asymmetric Matrices", IEEE Robotics and Automation Letters, vol. 7, No. 4, Oct. 2022, pp. 10898-10905.

Narang et al., "Factory: Fast Contact for Robotic Assembly", arXiv:2205.03532, May 7, 2022, 21 pages.

Zhang et al., "Efficient Sim-to-real Transfer of Contact-Rich Manipulation Skills with Online Admittance Residual Learning", 7th Conference on Robot Learning, 2023, pp. 1-19.

Ott et al., "Unified Impedance and Admittance Control", IEEE International Conference on Robotics and Automation, May 3-8, 2010, pp. 554-561.

Chen et al., "Decision Transformer: Reinforcement Learning via Sequence Modeling", 35th Conference on Neural Information Processing Systems, 2021, pp. 1-14.

Janner et al., "Offline Reinforcement Learning as One Big Sequence Modeling Problem", 35th Conference on Neural Information Processing Systems, 2021, pp. 1-14.

"Nvidia Physx System Software", https://www.nvidia.com/en-us/drivers/physx/physx-9-19-0218-driver/, 2023, 4 pages.

Haarnoja et al., "Soft Actor-Critic Algorithms and Applications", arXiv:1812.05905, Dec. 13, 2018, pp. 1-18.

Radford et al., "Language Models are Unsupervised Multitask Learners", 2019, 24 pages.

Fu et al., "Safe Self-Supervised Learning in Real of Visuo-Tactile Feedback Policies for Industrial Insertion", https://doi.org/10.48550/arXiv.2210.01340, 2023, 7 pages.

Lim et al., "Real2Sim2Real: Self-Supervised Learning of Physical Single-Step Dynamic Actions for Planar Robot Casting", https://doi.org/10.48550/arXiv.2210.01340, 2022, 8 pages.

Wang et al., "Safe Online Gain Optimization for Variable Impedance Control", arXiv:2111.01258v1 [cs.RO] Nov. 1, 2021, 7 pages.

Fu et al., "Safe Self-Supervised Learning in Real of Visuo-Tactile Feedback Policies for Industrial Insertion", arXiv:2210.01340v2 [cs.RO] Mar. 21, 2023, 7 pages.

Lim et al., "Real2Sim2Real: Self-Supervised Learning of Physical Single-Step Dynamic Actions for Planar Robot Casting", arXiv:2111.04814v2 [cs.RO] Jun. 25, 2022, 8 pages.

Extended European Search Report for Application No. 24200545.2 dated Feb. 21, 2025.

Wu et al., "Learning From Demonstration and Interactive Control of Variable-Impedance to Cut Soft Tissues", IEEE/ASME Transactions on Mechatronics, DOI 10.1109/TMECH.2021.3123356, vol. 27, No. 5, Oct. 1, 2022, pp. 2740-2751.

Abu-Dakka et al., "Variable Impedance Control and Learning—A Review", arXiv:2010.06246, Oct. 27, 2020, pp. 1-27.

* cited by examiner

700

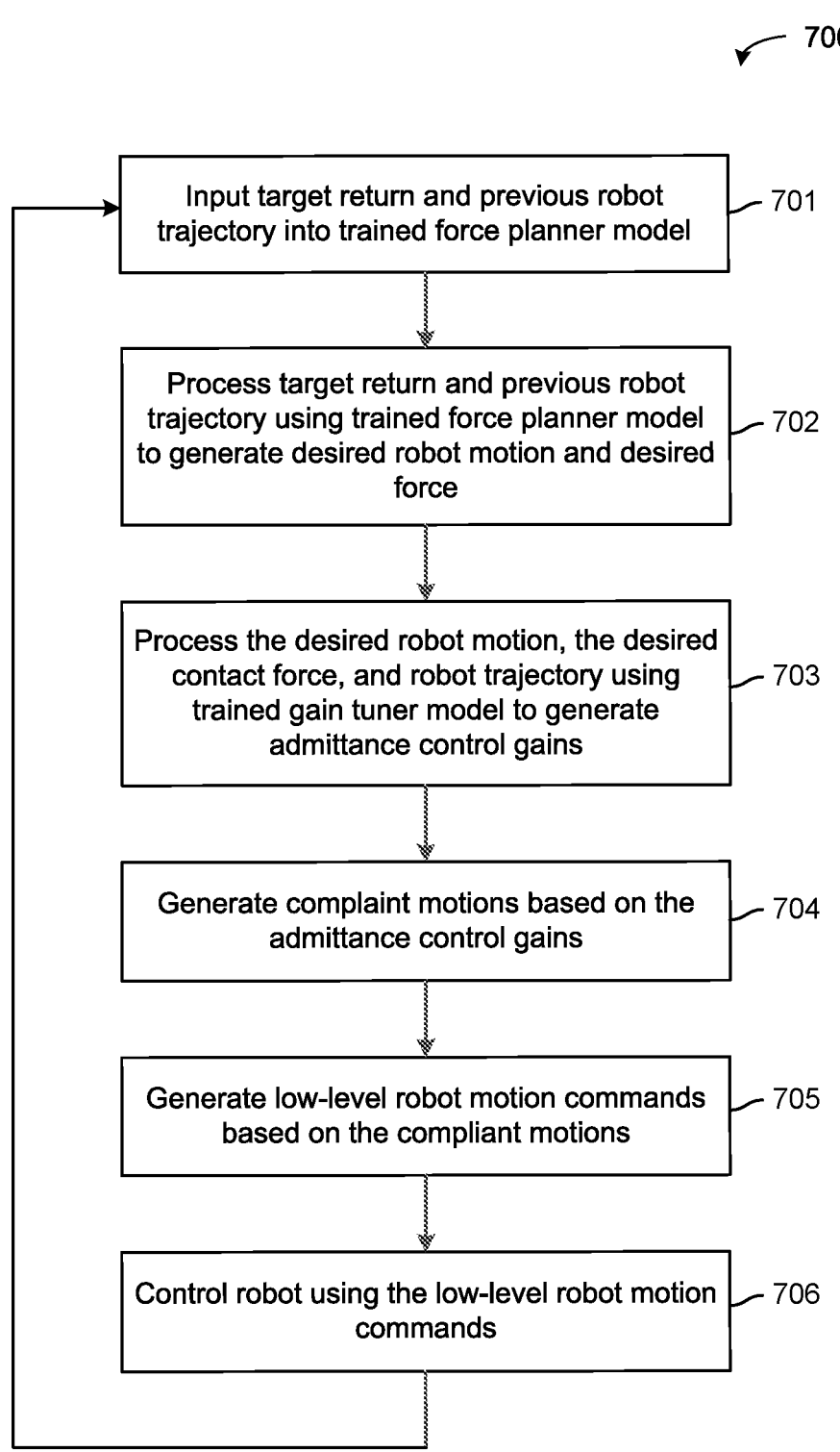

Input target return and previous robot trajectory into trained force planner model — 701

Process target return and previous robot trajectory using trained force planner model to generate desired robot motion and desired force — 702

Process the desired robot motion, the desired contact force, and robot trajectory using trained gain tuner model to generate admittance control gains — 703

Generate complaint motions based on the admittance control gains — 704

Generate low-level robot motion commands based on the compliant motions — 705

Control robot using the low-level robot motion commands — 706

FIG. 7

TECHNIQUES FOR CONTROLLING ROBOTS USING DYNAMIC GAIN TUNING

CROSS-REFERENCE TO RELATED APPLICATIONS

This application claims priority benefit of the United States Provisional Patent Application titled, "TECHNIQUES FOR CLOSING THE SIMULATION-TO-REALITY GAP USING DYNAMIC GAIN TUNING," filed on Sep. 14, 2023, and having Ser. No. 63/582,803. The subject matter of this related application is hereby incorporated herein by reference.

BACKGROUND

Field of the Various Embodiments

Embodiments of the present disclosure relate generally to robot control and machine learning, and more specifically, to techniques for controlling robots using dynamic gain tuning.

Description of the Related Art

Robots are being increasingly used to perform tasks automatically or autonomously in various environments. For example, industrial robots are used extensively in manufacturing processes, including processes that involve repetitive and/or repeatable tasks. An ongoing challenge with using robots to perform tasks, however, is effectively controlling those robots, especially when performing high-precision tasks. As an example of a high-precision task, when assembling machinery, a robot could be tasked with inserting a peg into a hole where there is little clearance between the outer perimeter or surface of the peg and the walls of the hole.

Some conventional approaches for controlling a robot to perform a given task use deterministic algorithms to guide the robot through sequences of pre-programmed operations. As a general matter, the sequences of pre-programmed operations have to be meticulously planned and executed with a high level of precision that accounts for the tolerances and small motions typically required by a robot to complete a task. One limitation of using deterministic algorithms is that such algorithms are static and are, therefore, not typically adaptable to variations in operating conditions. Accordingly, implementing deterministic algorithms can result in robot failures or underperformance when unexpected changes occur, such as when different component sizes and/or positions are encountered, and those changes are not accounted for in the pre-programmed operations.

Another conventional approach for controlling a robot to perform a task involves training a machine learning model to control the robot using real-world training data from physical robot interactions with a real-world environment by trial and error. However, data collection by trial and error for machine learning is time consuming, and can often be damaging to objects, robots, and sensors, especially for industrial high-precision tasks.

Yet another conventional approach for controlling a robot to perform a task involves training a machine learning model to control the robot using simulations of the robot performing the task in a virtual environment. During the simulations, the machine learning model is exposed to various scenarios reflective of real-world conditions. Subsequently, the trained machine learning model can control a robot to perform the task in a real-world environment while handling unexpected changes, such as variations in component sizes or positions, when the task is being performed in the real-world environment.

One drawback of conventional approaches for training a machine learning model to control a robot using simulations is that, oftentimes, the trained machine learning model cannot correctly control a physical robot to perform a given task in a real-world environment when the real-world environment differs significantly from the simulation environment that was used to train the machine learning model. For example, a machine learning model that is trained to control a robot to insert a peg into a hole within a simulation environment can fail to control a physical robot to perform the same task in a real-world environment when the size of the peg or the diameter of the hole differs in the real-world environment.

Another drawback of conventional approaches for training a machine learning model to control a robot using simulations is that, to train a machine learning model to correctly control a physical robot in a real-world environment, these approaches require simulations in which the physical interactions between robots and different materials and objects are modeled very precisely. However, modeling physical interactions very precisely is oftentimes prohibitively computationally expensive and time consuming.

As the foregoing indicates, what is needed in the art are more effective techniques for controlling robots.

SUMMARY

One embodiment of the present disclosure sets forth a computer-implemented method for controlling a robot. The method includes generating, via a first trained machine learning model, a robot motion and a predicted force associated with the robot motion. The method also includes determining, via a second trained machine learning model, a gain associated with the predicted force. The method further includes generating one or more robot commands based on the robot motion and the gain. In addition, the method includes causing a robot to move based on the one or more robot commands.

Other embodiments of the present disclosure include, without limitation, one or more computer-readable media including instructions for performing one or more aspects of the disclosed techniques as well as one or more computing systems for performing one or more aspects of the disclosed techniques.

At least one technical advantage of the disclosed techniques relative to the prior art is that the disclosed techniques train, using simulation data, machine learning models that can correctly control physical robots in real-world environments. In particular, the trained machine learning models can control physical robots to perform high-precision tasks more successfully relative to conventional machine learning models and deterministic algorithms. For example, a machine learning model that is trained according to techniques disclosed herein can control a robot to complete an insertion task, while being robust to variations in object shape, material, and position. In addition, the disclosed techniques do not require the machine learning models to be trained using very precise simulations of physical interactions that are prohibitively computationally expensive or time consuming. These technical advantages represent one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

FIG. 7 is a flow diagram of method steps for using trained machine learning models to control a robot, according to various embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

System Overview

Figure 1:
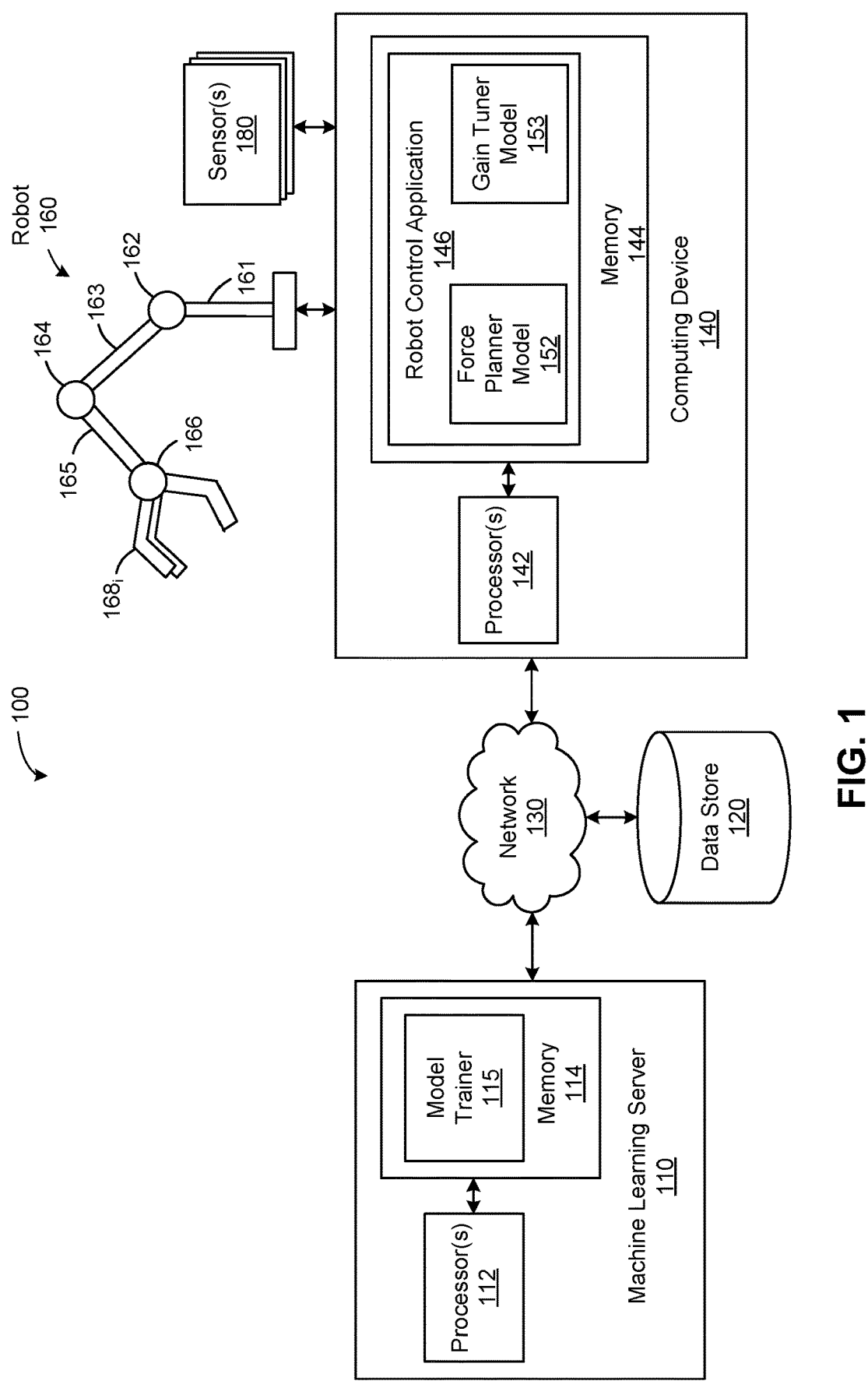
FIG. 1 illustrates a block diagram of a computer-based system configured to implement one or more aspects of the various embodiments.

FIG. 1 illustrates a block diagram of a computer-based system 100 configured to implement one or more aspects of at least one embodiment. As shown, system 100 includes a machine learning server 110, a data store 120, and a computing device 140 in communication over a network 130, which can be a wide area network (WAN) such as the Internet, a local area network (LAN), a cellular network, and/or any other suitable network.

As shown, a model trainer 115 executes on one or more processors 112 of machine learning server 110 and is stored in a system memory 114 of machine learning server 110. Processor 112 receives user input from input devices, such as a keyboard or a mouse. In operation, one or more processors 112 may include one or more primary processors of machine learning server 110, controlling and coordinating operations of other system components. In particular, processor(s) 112 can issue commands that control the operation of one or more graphics processing units (GPUs) (not shown) and/or other parallel processing circuitry (e.g., parallel processing units, deep learning accelerators, etc.) that incorporates circuitry optimized for graphics and video processing, including, for example, video output circuitry. The GPU(s) can deliver pixels to a display device that can be any conventional cathode ray tube, liquid crystal display, light-emitting diode display, and/or the like.

System memory 114 of machine learning server 110 stores content, such as software applications and data, for use by processor(s) 112 and the GPU(s) and/or other processing units. System memory 114 can be any type of memory capable of storing data and software applications, such as a random-access memory (RAM), a read-only memory (ROM), an erasable programmable read-only memory (EPROM or Flash ROM), or any suitable combination of the foregoing. In some embodiments, a storage (not shown) can supplement or replace system memory 114. The storage can include any number and type of external memories that are accessible to processor 112 and/or the GPU. For example, and without limitation, the storage can include a Secure Digital Card, an external Flash memory, a portable compact disc read-only memory (CD-ROM), an optical storage device, a magnetic storage device, and/or any suitable combination of the foregoing.

Machine learning server 110 shown herein is for illustrative purposes only, and variations and modifications are possible without departing from the scope of the present disclosure. For example, the number of processors 112, the number of GPUs and/or other processing unit types, the number of system memories 114, and/or the number of applications included in the system memory 114 can be modified as desired. Further, the connection topology between the various units in FIG. 1 can be modified as desired. In some embodiments, any combination of processor(s) 112, system memory 114, and/or GPU(s) can be included in and/or replaced with any type of virtual computing system, distributed computing system, and/or cloud computing environment, such as a public, private, or a hybrid cloud system.

In some embodiments, model trainer 115 is configured to train one or more machine learning models, including a force planner model 152 and a gain tuner model 153 that are trained to control a robot to perform a task. Techniques that model trainer 115 can employ to train machine learning model(s) are discussed in greater detail below in conjunction with FIGS. 3-7. Training data and/or trained (or deployed) machine learning models, including force planner model 152 and gain tuner model 153, can be stored in data store 120. In some embodiments, data store 120 can include any storage device or devices, such as fixed disc drive(s), flash drive(s), optical storage, network attached storage (NAS), and/or a storage area-network (SAN). Although shown as accessible over network 130, in some embodiments machine learning server 110 can include data store 120.

As shown, a robot control application 146 that uses force planner model 152 and gain tuner model 153 is stored in a system memory 144, and executes on a processor 142, of computing device 140. Once trained, force planner model 152 and gain tuner model 153 can be deployed in any suitable manner, such as via robot control application 146. Illustratively, given sensor data captured by one or more sensors 180 (e.g., force sensors, cameras), force planner model 152 and gain tuner model 153 can be used to control a robot 160 to perform one or more tasks for which force planner model 152 and gain tuner model 153 were trained. In some embodiments, the one or more sensors 180 can include a force sensor on a wrist of robot 160 that measures contact forces.

As shown, robot 160 includes multiple links 161, 163, and 165 that are rigid members, as well as joints 162, 164, and 166, which are movable components that can be actuated to cause relative motion between adjacent links. In addition, robot 160 includes multiple fingers 168$i$ (referred to herein collectively as fingers 168 and individually as a finger 168) that can be controlled to grip an object. For example, in some embodiments, robot 160 can include a locked wrist and multiple fingers. Although an example robot 160 is shown for illustrative purposes, in some embodiments, techniques disclosed herein can be applied to control any suitable robot.

Figure 2:
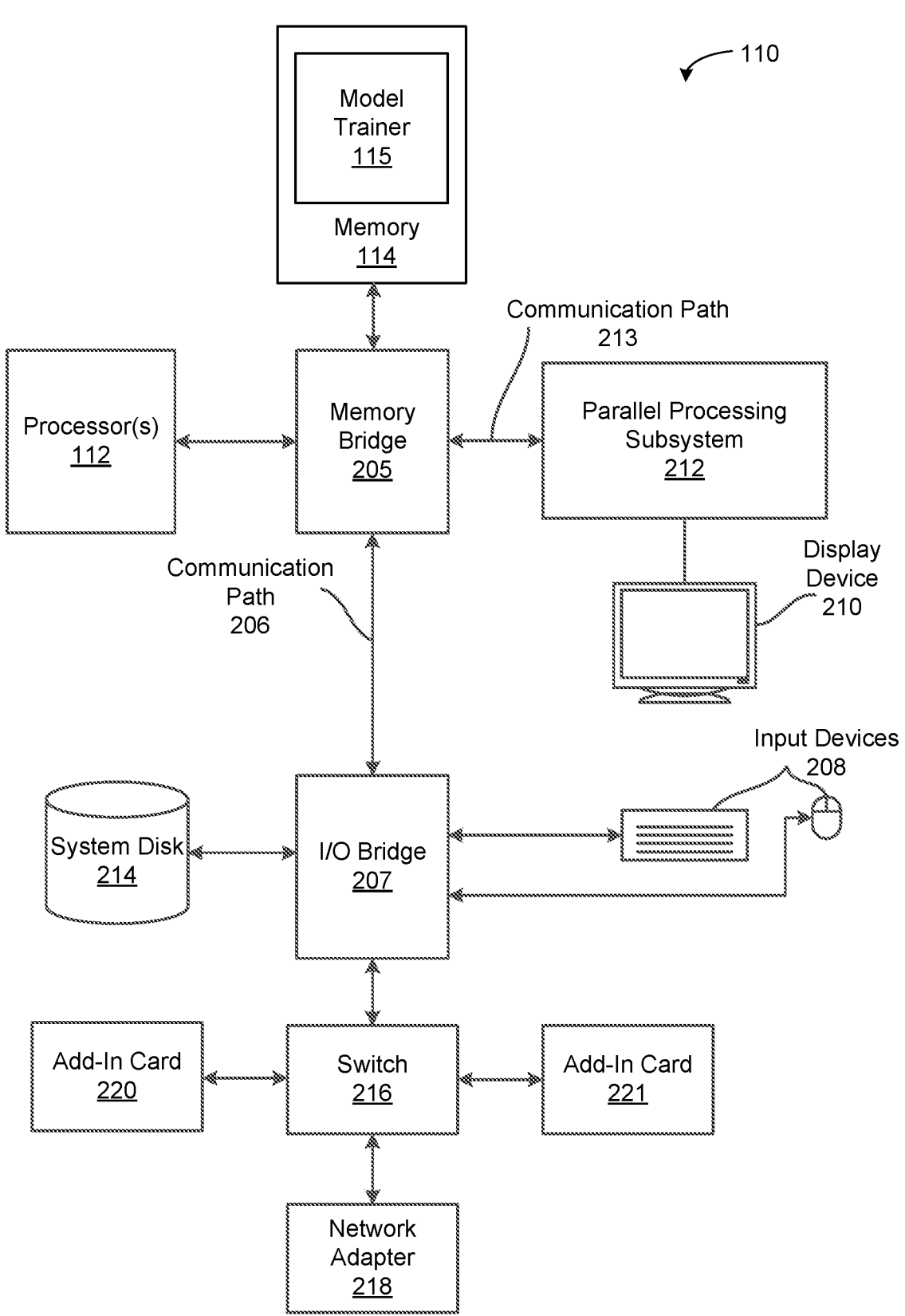
FIG. 2 is a more detailed illustration of the machine learning server of FIG. 1, according to various embodiments.

FIG. 2 is a block diagram illustrating machine learning server 110 of FIG. 1 in greater detail, according to various embodiments. Machine learning server 110 can include any type of computing system, including, without limitation, a server machine, a server platform, a desktop machine, a laptop machine, a hand-held/mobile device, a digital kiosk, an in-vehicle infotainment system, and/or a wearable device. In some embodiments, machine learning server 110 is a server machine operating in a data center or a cloud computing environment that provides scalable computing resources as a service over a network.

In some embodiments, machine learning server 110 includes, without limitation, processor(s) 112 and memory(ies) 114 coupled to a parallel processing subsystem 212 via a memory bridge 205 and a communication path 213. Memory bridge 205 is further coupled to an I/O (input/output) bridge 207 via a communication path 206, and I/O bridge 207 is, in turn, coupled to a switch 216.

In one embodiment, I/O bridge 207 is configured to receive user input information from optional input devices 208, such as a keyboard, mouse, touch screen, sensor data analysis (e.g., evaluating gestures, speech, or other information about one or more uses in a field of view or sensory field of one or more sensors), and/or the like, and forward the input information to processor(s) 142 for processing. In some embodiments, machine learning server 110 may be a server machine in a cloud computing environment. In such embodiments, machine learning server 110 may not include input devices 208, but can receive equivalent input information by receiving commands (e.g., responsive to one or more inputs from a remote computing device) in the form of messages transmitted over a network and received via the network adapter 218. In some embodiments, switch 216 is configured to provide connections between I/O bridge 207 and other components of the machine learning server 110, such as a network adapter 218 and various add in cards 220 and 221.

In some embodiments, I/O bridge 207 is coupled to a system disk 214 that may be configured to store content and applications and data for use by processor(s) 112 and parallel processing subsystem 212. In one embodiment, system disk 214 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high-definition DVD), or other magnetic, optical, or solid state storage devices. In some embodiments, other components, such as universal serial bus or other port connections, compact disc drives, digital versatile disc drives, film recording devices, and the like, may be connected to I/O bridge 207 as well.

In some embodiments, memory bridge 205 may be a Northbridge chip, and I/O bridge 207 may be a Southbridge chip. In addition, communication paths 206 and 213, as well as other communication paths within machine learning server 110, may be implemented using any technically suitable protocols, including, without limitation, AGP (Accelerated Graphics Port), HyperTransport, or any other bus or point to point communication protocol known in the art.

In some embodiments, parallel processing subsystem 212 comprises a graphics subsystem that delivers pixels to an optional display device 210 that may be any conventional cathode ray tube, liquid crystal display, light-emitting diode display, and/or the like. In such embodiments, parallel processing subsystem 212 may incorporate circuitry optimized for graphics and video processing, including, for example, video output circuitry. Such circuitry may be incorporated across one or more parallel processing units (PPUs), also referred to herein as parallel processors, included within parallel processing subsystem 212.

In some embodiments, parallel processing subsystem 212 incorporates circuitry optimized (e.g., that undergoes optimization) for general purpose and/or compute processing. Again, such circuitry may be incorporated across one or more PPUs included within parallel processing subsystem 212 that are configured to perform such general purpose and/or compute operations. In yet other embodiments, the one or more PPUs included within parallel processing subsystem 212 may be configured to perform graphics processing, general purpose processing, and/or compute processing operations. System memory 114 includes at least one device driver configured to manage the processing operations of the one or more PPUs within parallel processing subsystem 212. In addition, system memory 114 includes model trainer 116. Although described herein primarily with respect to model trainer 116, techniques disclosed herein can also be implemented, either entirely or in part, in other software and/or hardware, such as in parallel processing subsystem 212.

In some embodiments, parallel processing subsystem 212 may be integrated with one or more of the other elements of FIG. 2 to form a single system. For example, parallel processing subsystem 212 may be integrated with processor 142 and other connection circuitry on a single chip to form a system on a chip (SoC).

In some embodiments, processor(s) 112 includes the primary processor of machine learning server 110, controlling and coordinating operations of other system components. In some embodiments, processor(s) 112 issues commands that control the operation of PPUs. In some embodiments, communication path 213 is a PCI Express link, in which dedicated lanes are allocated to each PPU. Other communication paths may also be used. The PPU advantageously implements a highly parallel processing architecture, and the PPU may be provided with any amount of local parallel processing memory (PP memory).

It will be appreciated that the system shown herein is illustrative and that variations and modifications are possible. The connection topology, including the number and arrangement of bridges, the number of CPUs 202, and the number of parallel processing subsystems 212, may be modified as desired. For example, in some embodiments, system memory 114 could be connected to processor(s) 112 directly rather than through memory bridge 205, and other devices may communicate with system memory 114 via memory bridge 205 and processor 112. In other embodiments, parallel processing subsystem 212 may be connected to I/O bridge 207 or directly to processor 112, rather than to memory bridge 205. In still other embodiments, I/O bridge 207 and memory bridge 205 may be integrated into a single chip instead of existing as one or more discrete devices. In certain embodiments, one or more components shown in FIG. 2 may not be present. For example, switch 216 could be eliminated, and network adapter 218 and add in cards 220, 221 would connect directly to I/O bridge 207. Lastly, in certain embodiments, one or more components shown in FIG. 2 may be implemented as virtualized resources in a virtual computing environment, such as a cloud computing environment. In particular, parallel processing subsystem 212 may be implemented as a virtualized parallel processing subsystem in some embodiments. For example, parallel processing subsystem 212 may be implemented as a virtual graphics processing unit(s) (vGPU(s)) that renders graphics on a virtual machine(s) (VM(s)) executing on a server machine(s) whose GPU(s) and other physical resources are shared across one or more VMs.

Figure 3:
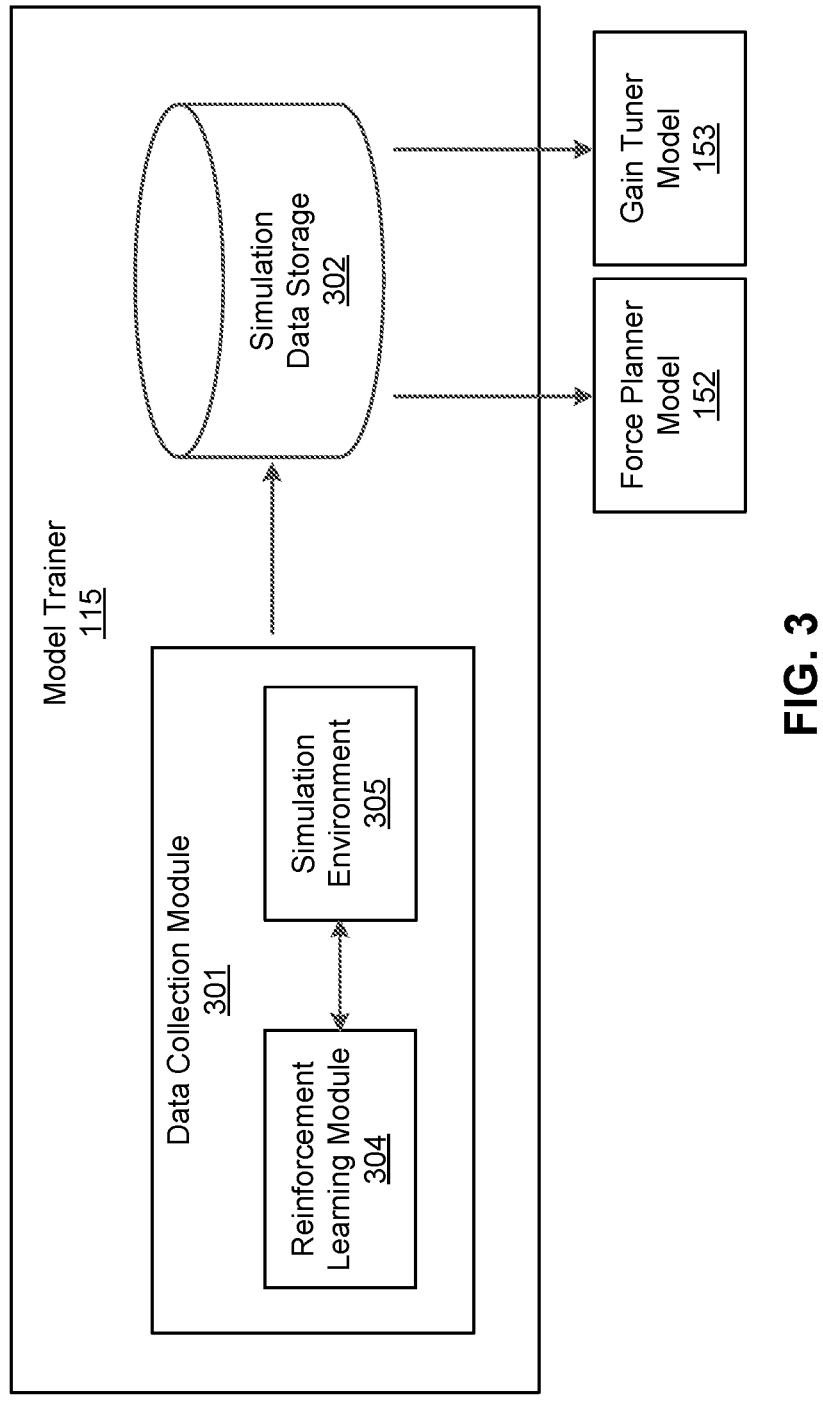
FIG. 3 is a more detailed illustration of the model trainer of FIG. 1, according to various embodiments.

FIG. 3 is a more detailed illustration of model trainer 115 of FIG. 1, according to various embodiments. As shown, model trainer 115 includes a data collection module 301 and a simulation data storage 302. In operation, model trainer 115 trains force planner model 152 and gain tuner model 153.

Data collection module 301 collects robot interaction simulation data that can be used to train force planner model 152 and gain tuner model 153 via supervised learning. As shown, data collection module 301 includes a reinforcement learning module 304 and a simulation environment 305.

Reinforcement learning module 304 trains, using reinforcement learning and simulations of a robot within simulation environment 305, a reinforcement learning agent (not shown) to control a robot to perform a task. Any technically feasible reinforcement learning can be performed, including known reinforcement learning techniques. The reinforcement learning generates simulation data involving the robot performing task(s) within simulation environment 305 during the reinforcement learning. In some embodiments, the simulation data is collected as a simulation dataset that can include robot states and motions, previous admittance gains, desired forces, robot trajectories during simulations, and whether the robot successfully performed one or more tasks during the simulations. In turn, the simulation dataset can be used to train force planner model 152 and gain tuner model 153 via supervised learning, discussed in greater detail below.

More formally, robot dynamics can be described according to a mass-spring-damping model driven by an external force f:

$$M\ddot{x} + D\dot{x} + Kx = f, \tag{1}$$

where, M, K, and D are the inertia, stiffness, and damping matrices, respectively. M, K, D are positive definite diagonal matrices with diagonal entries $m_i$, $k_i$, $d_i > 0$ for i=1, 2, . . . , 6. Returning to the example of a robot insertion task in which one object (e.g., a peg) is inserted into another object (e.g., an object with a hole), the robot insertion task can be modelled as a Markov Decision Process (MDP), denoted as $\{S, A, R, P, \gamma\}$, where $S \in \mathbb{R}^{18}$ includes position $x \in \mathbb{R}^6$, such as a peg pose, a velocity $\dot{x} \in \mathbb{R}^6$, and a contact force $f \in \mathbb{R}^6$. The action space $A \in \mathbb{R}^{12}$ includes the incremental robot Cartesian motion $\Delta x \in \mathbb{R}^6$ and the diagonal entries of the stiffness matrix $k = \{k_1, \ldots, k_6\}$. The reward function R can be defined such that deviations from desired motions are rewarded. For example, elements of the reward function can be defined as $r = -\|x_{pos} - x_d\|_2$, where $x_d$ is the desired pose, which penalizes the Euclidean distance between a current pose of the robot and a fixed target point inside a hole. P represents the state-transition probability, which defines the probability of the robot moving from one position, velocity, and force to another given an action. In addition, the constant $\gamma \in [0,1)$ is a discount factor. During reinforcement learning, the reinforcement learning module 304 trains, for a reinforcement learning agent, a policy $\pi : S \rightarrow A$ that maps a position, a velocity, and a force into an action that maximizes the expected sum of discounted rewards $$\mathbb{E}_\pi\left[\sum_{t=0}^{T-1} \gamma^t r(s_t)\right].$$

In some embodiments, reinforcement learning module 304 only trains a policy for the robot stiffness K, while keeping the inertia matrix M fixed, for simplicity. In some embodiments, the damping matrix D is computed as $D = 4\sqrt{MK}$ to ensure an overdamped system. In some embodiments, reinforcement learning module 304 uses any technically feasible reinforcement learning techniques, such as the Soft-Actor-Critic technique and/or the like, to initially train on a task with a larger clearance (e.g., a clearance of 0.5 mm) to establish a baseline policy. The initial training sets the stage for subsequent training for more challenging tasks, such as an insertion with a smaller clearance (e.g., a 0.3 mm clearance) mirroring the intricate demands of real-world tasks.

Reinforcement learning module 304 uses simulation environment 305 to generate a data set of simulated robot trajectories $\tau_i$, i=1, 2, . . . , N. For example, in some embodiments, simulation environment 305 can use a physics engine, such as the PhysX physics engine, to simulate insertion tasks involving square peg-and-hole scenarios. In some embodiments, robustness of simulation environment 305 can be enhanced by techniques such as domain randomization, data augmentation, and/or the like, which can introduce real-world complexities into simulation environment 305 by, for example, varying the initial pose of a peg and/or a hole location and/or by adjusting the contact force with a scaling factor (e.g., ranging between 0.4 to 1.4), thereby emulating different force responses that robot 160 can experience due to the variable nature of real-world physical interactions. In some embodiments, zero-mean Gaussian noise with standard deviation of one Newton is included in simulation environment 305 to mirror the sensory noise that can be encountered in a real-world environment.

Simulation data storage 302 stores the simulated robot trajectories $\tau_i$, i=1, 2, . . . , N as a simulation dataset. In some embodiments, the simulated robot trajectories in the simulation dataset can each include robot poses, robot velocities, incremental robot Cartesian motion, diagonal entries of the stiffness matrix, contact forces, and/or the like. In some embodiments, simulation data storage 302 can include any storage device or devices, such as fixed disc drive(s), flash drive(s), optical storage, network attached storage (NAS), and/or a storage area-network (SAN).

Model trainer 115 uses the simulation dataset stored in simulation data storage 302 to train force planner model 152 and gain tuner model 153. Force planner model 152 is a machine learning model that (1) receives as inputs a return indicating an end goal of a task and a previous robot trajectory, and (2) generates a next robot motion and associated contact force. Gain tuner model 153 is another machine learning model that (1) receives as inputs the previous robot trajectory and the robot motion and associated contact force from force planner model 152, and (2) predicts compliance gains for the robot to maintain the correct force application when performing a task. Force planner model 152 and gain tuner model 153 can be implemented in any technically feasible manner. For example, in some embodiments, force planner model 152 and gain tuner model 153 can be implemented as transformer models. As a specific example, force planner model 152 and gain tuner model 153 could be artificial neural networks having Decision Transformer (DT) architectures. In operation, force planner model 152 generates a robot motion and force needed to achieve a desired outcome, and gain tuner model 153 works in tandem with force planner model 152 to adjust the robot compliance, or "give," in response to real-time feedback. In some embodiments, gain tuner model 153 processes the motions and forces generated by the force planner model 152 and determines appropriate admittance gains that can be used to adapt the robot behavior according to physical dynamics of the task, allowing for more accurate and responsive control. In some embodiments, model trainer 115 concurrently trains force planner model 152 and gain tuner model 153 using supervised training and the simulation dataset that is generated via reinforcement learning, described above, and stored in simulation data storage 302.

More formally, in some embodiments, to train gain tuner model 153, a probability distribution $P(f_{t+1} | \Delta x_t, k_t, s_t, E)$ can be used to model the next contact force $f_{t+1}$ which depends on the current state $s_t$, the robot motion $\Delta x_t$, admittance gain $k_t$, and environmental properties, such as part geometry, friction, surface stiffness, and/or the like, denoted by E. In some embodiments, the conditional probability distribution for the next contact force is decomposed as follows:

$$P(f_{t+1} | \Delta x_t, k_t, s_t, E) = \frac{P(k_t | f_{t+1}, \Delta x_t, s_t, E) P(\Delta x_t, f_{t+1} | s_t, E)}{P(\Delta x_t, k_t | s_t, E)}. \quad (2)$$

Given the distribution of the robot motion and next contact force $P(\Delta x_t, f_{t+1} | s_t, E)$, the admittance gain $k_t$ are adjusted relative to $\Delta x_t$, $s_t$, and E to align the contact force achieved by the robot $P(f_{t+1} | \Delta x_t, k_t, s_t, E)$ with the target distribution. In practice, the distribution $P(\Delta x_t, f_{t+1} | s_t, E)$ is often unknown. In some embodiments, gain tuner model 153 is modeled as $$GT(k_t | f_{t+1}^d, \Delta x_t, s_t, E),$$

which tunes the admittance gain automatically to match the actual forces with the desired forces $f^d$. In some embodiments, previous trajectory data $\tau^{gt}$ is used to approximate environmental properties E:

$$\tau_t^{gt} = (x_{t-H}, \dot{x}_{t-H}, \Delta x_{t-H}, k_{t-H}, f_{t-H+1}^d, \ldots, x_{t-1}, \dot{x}_{t-1}, \Delta x_{t-1}, k_{t-1}, f_t^d), \quad (3)$$

where H is a preset window size, based on the intuition that the environmental properties E are encoded in the previous trajectory $\tau^{gt}$, and therefore E can be inferred from $\tau^{gt}$. Replacing the dependency on E with $\tau^{gt}$, gain tuner model 153 is modeled as $$GT(k_t | f_{t+1}^d, \Delta x_t, x_t, \dot{x}_t, \tau_t^{gt}).$$

At each time step t, the inputs for gain tuner model 153 are $$\tau_t^{gt}, x_t, \dot{x}_t, \Delta x_t,$$

and the planned next force $$f_{t+1}^d.$$

The output of gain tuner model 153 is the predicted admittance gain $k_t$. In some embodiments, during training, the planned next force $$f_{t+1}^d$$

is replaced with the ground truth $f_{t+1}$ available from the simulation dataset stored in simulation data storage 302, and the training loss is the mean-squared error (MSE) between the predicted and actual admittance gains.

In some embodiments, to facilitate training, an extended action space $A'=[\Delta x, f^d]$ is used, which includes both the robotic motion $\Delta x$ and the desired next contact force $f^d$. For each training iteration, first a robot trajectory with a window size of H is sampled from the simulated dataset stored in simulation data storage 302, which is denoted as:

$$\tau_t^{fp} = (s_{t-H}, a'_{t-H}, R_{t-H}, \ldots, s_{t-1}, a'_{t-1}, R_{t-1}) \quad (4)$$

$$= (x_{t-H}, \dot{x}_{t-H}, f_{t-H}, \Delta x_{t-H}, f_{t-H+1}^d, R_{t-H}, \ldots,$$

$$x_{t-1}, \dot{x}_{t-1}, f_{t-1}, \Delta x_{t-1}, f_t^d, R_{t-1})$$

where $$R_t = \sum_{t'=t}^{T} r_{t'}$$

is the desired future return until the last timestep of the trajectory T. Then, $$\tau_t^{fp}$$

is combined with the current robot state $s_t=[x_t, \dot{x}_t, f_t]$ and the desired return $R_t$ to serve as the input for the force planner $$FP(\Delta x_t, f_{t+1}^d | x_t, \dot{x}_t, f_t, R_t, \tau_t^{fp}).$$

Force planner model 152 predicts the subsequent robotic motion $\Delta x_t$ and the next contact force $$f_{t+1}^d.$$

Model trainer 115 uses an MSE loss function for the robot motion to train force planner model 152 and the next contact force is enforced to train force planner model 152.

In some embodiments, gain tuner model 153 includes a GPT-2 model, or a similar model, that generates admittance gains by processing mappings of a stack of robot states and motions, previous admittance gains, and desired forces to 128-dimensional embedding spaces. In such cases, the embeddings are processed to predict the next admittance gains and robot motions, with force planner model 152 also considering different modalities such as state, action, and return for the predictions.

In some embodiments, machine learning model 303 trains force planner model 152 and gain tuner model 153 in batch that involves both supervised learning techniques and reinforcement learning techniques as follows: (1) initialization: A simulated trajectory dataset $\{\tau_i | i=1, \ldots, N\}$ is prepared, and a dataloader D is initialized as an empty set; (2) Data Collection: For each simulation run i in N total runs: The simulation is iterated over T−1 time steps. At each time step t, the robot state $x_t$, action $A_x$, and the next contact force $f_{t+1}$ are collected and added to the dataloader D. The desired return $R_t$ is obtained using the equation $$R_t = \sum_{t'=t}^{T} r_{t'},$$

where $r_{t'}$ is the immediate reward at time t', and added to D; (3) Batch Processing: The collected data in D is processed in batches. For each batched set of data $\{x_t, A_x, f_t, f_{next}, R, \tau\}$: gain tuner model 153 computes the admittance gain k using the equation $k=GT(k_{next}, A_x, x_t, \tau_{gt})$, where $k_{next}$ is the subsequent admittance gain, $A_x$ is the action, $x_t$ is the current state, and $\tau_{gt}$ is the previous trajectory data. The loss function for gain tuner model 153 is calculated as Loss $s_{gt}=\|k-k_{next}\|^2$, representing the squared difference between the predicted and actual admittance gains; (4) Force Planner Training: force planner model 152 predicts the next state $\Delta x_{next}$ using the function $FP(A_x, f_{next}, x_t, R, \tau_{fp})$, which considers the action $A_x$, the predicted next force $f_{next}$, the current state $x_t$, the desired return R, and the trajectory $\tau_{fp}$. The loss function for force planner model 152 is calculated as Loss $f_p=\|\Delta x-\Delta x_{actual}\|^2+\|f_{next} f_{actual}\|^2$, which combines the squared difference between the predicted and actual state changes with the squared difference between the predicted and actual forces; (5) Model Updates: Both gain tuner model 153 and force planner model 152 are updated to minimize the respective loss functions, Loss $s_{gt}$ and Loss$_{fp}$, using optimization methods, such as gradient descent and/or the like.

Figure 4:
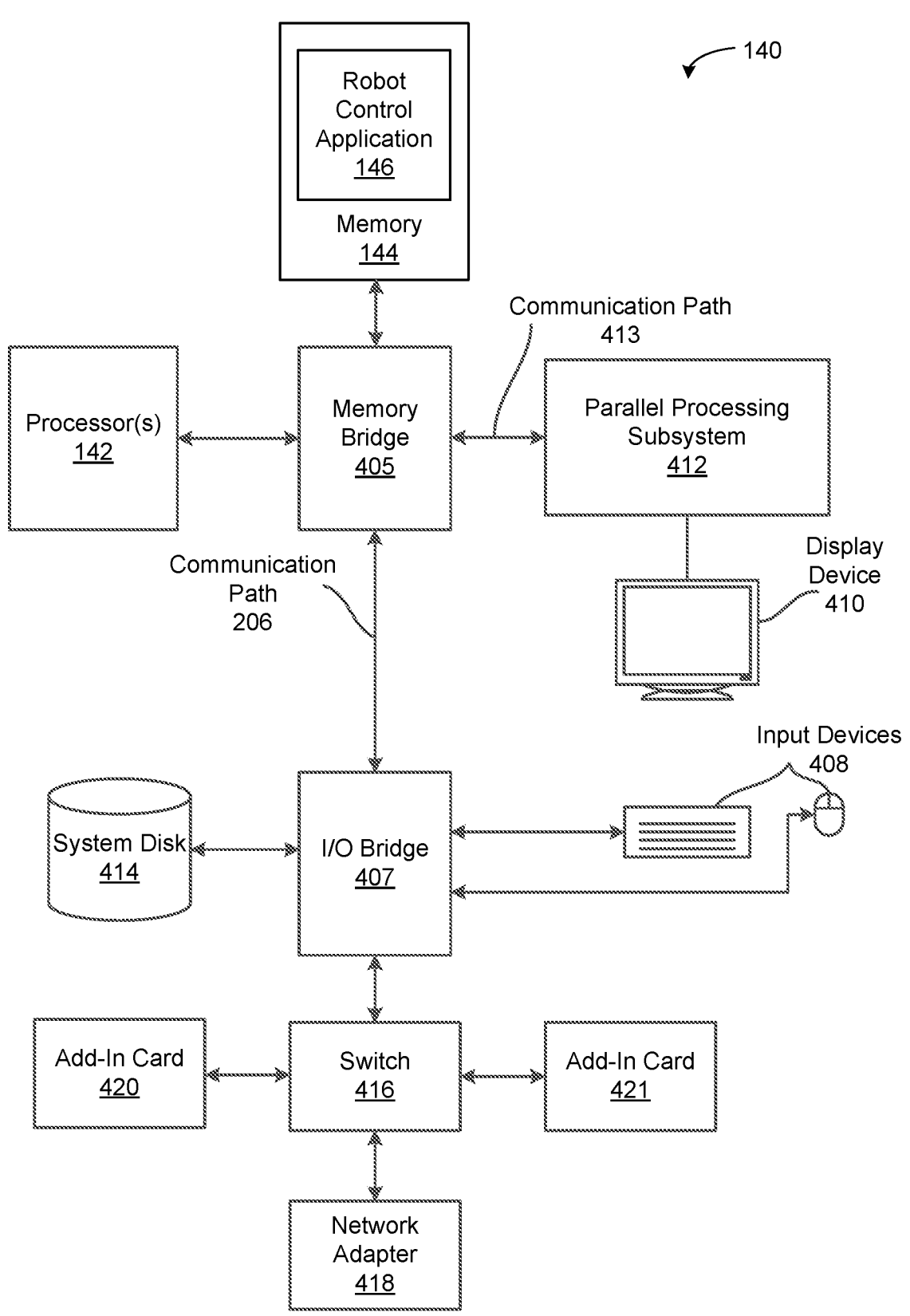
FIG. 4 is a more detailed illustration of the computing device of FIG. 1, according to various embodiments.

FIG. 4 is a block diagram illustrating computing device 140 of FIG. 1 in greater detail, according to various embodiments. Computing device 140 can include any type of computing system, including, without limitation, a server machine, a server platform, a desktop machine, a laptop machine, a hand-held/mobile device, a digital kiosk, an in-vehicle infotainment system, and/or a wearable device. In some embodiments, computing device 140 is a server machine operating in a data center or a cloud computing environment that provides scalable computing resources as a service over a network.

In some embodiments, computing device 140 includes, without limitation, processor(s) 142 and memory(ies) 144 coupled to a parallel processing subsystem 412 via a memory bridge 405 and a communication path 413. Memory bridge 405 is further coupled to an I/O (input/output) bridge 407 via a communication path 406, and I/O bridge 407 is, in turn, coupled to a switch 416.

In one embodiment, I/O bridge 407 is configured to receive user input information from optional input devices 408, such as a keyboard, mouse, touch screen, sensor data analysis (e.g., evaluating gestures, speech, or other information about one or more uses in a field of view or sensory field of one or more sensors), and/or the like, and forward the input information to processor(s) 142 for processing. In some embodiments, computing device 140 can be a server machine in a cloud computing environment. In such embodiments, computing device 140 can not include input devices 408, but can receive equivalent input information by receiving commands (e.g., responsive to one or more inputs from a remote computing device) in the form of messages transmitted over a network and received via network adapter 418. In some embodiments, switch 416 is configured to provide connections between I/O bridge 407 and other components of machine learning server 110, such as a network adapter 418 and various add in cards 420 and 421.

In some embodiments, I/O bridge 407 is coupled to a system disk 414 that can be configured to store content and applications and data for use by processor(s) 142 and parallel processing subsystem 412. In one embodiment, system disk 414 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high-definition DVD), or other magnetic, optical, or solid state storage devices. In some embodiments, other components, such as universal serial bus or other port connections, compact disc drives, digital versatile disc drives, film recording devices, and the like, can be connected to I/O bridge 407 as well.

In some embodiments, memory bridge 405 may be a Northbridge chip, and I/O bridge 407 can be a Southbridge chip. In addition, communication paths 406 and 413, as well as other communication paths within computing device 140, can be implemented using any technically suitable protocols, including, without limitation, AGP (Accelerated Graphics Port), HyperTransport, or any other bus or point to point communication protocol known in the art.

In some embodiments, parallel processing subsystem 412 comprises a graphics subsystem that delivers pixels to an optional display device 210 that may be any conventional cathode ray tube, liquid crystal display, light-emitting diode display, and/or the like. In such embodiments, parallel processing subsystem 412 can incorporate circuitry optimized for graphics and video processing, including, for example, video output circuitry. Such circuitry may be incorporated across one or more parallel processing units (PPUs), also referred to herein as parallel processors, included within parallel processing subsystem 412.

In some embodiments, parallel processing subsystem 412 incorporates circuitry optimized (e.g., that undergoes optimization) for general purpose and/or compute processing. Again, such circuitry may be incorporated across one or more PPUs included within parallel processing subsystem 412 that are configured to perform such general purpose and/or compute operations. In yet other embodiments, the one or more PPUs included within parallel processing subsystem 412 can be configured to perform graphics processing, general purpose processing, and/or compute processing operations. System memory 144 includes at least one device driver configured to manage the processing operations of the one or more PPUs within parallel processing subsystem 412. In addition, system memory 144 includes robot control application 146. Although described herein primarily with respect to robot control application 146, techniques disclosed herein can also be implemented, either entirely or in part, in other software and/or hardware, such as in parallel processing subsystem 412.

In some embodiments, parallel processing subsystem 412 can be integrated with one or more of the other elements of FIG. 2 to form a single system. For example, parallel processing subsystem 412 can be integrated with processor 142 and other connection circuitry on a single chip to form a system on a chip (SoC).

In some embodiments, processor(s) 142 includes the primary processor of computing device 140, controlling and coordinating operations of other system components. In some embodiments, processor(s) 142 issues commands that control the operation of PPUs. In some embodiments, communication path 412 is a PCI Express link, in which dedicated lanes are allocated to each PPU. Other communication paths may also be used. The PPU advantageously implements a highly parallel processing architecture, and the PPU may be provided with any amount of local parallel processing memory (PP memory).

It will be appreciated that the system shown herein is illustrative and that variations and modifications are possible. The connection topology, including the number and arrangement of bridges, the number of CPUs 402, and the number of parallel processing subsystems 412, can be modified as desired. For example, in some embodiments, system memory 144 could be connected to processor(s) 142 directly rather than through memory bridge 405, and other devices can communicate with system memory 144 via memory bridge 405 and processor 142. In other embodiments, parallel processing subsystem 412 can be connected to I/O bridge 407 or directly to processor 142, rather than to memory bridge 405. In still other embodiments, I/O bridge 407 and memory bridge 405 can be integrated into a single chip instead of existing as one or more discrete devices. In certain embodiments, one or more components shown in FIG. 2 may not be present. For example, switch 416 could be eliminated, and network adapter 418 and add in cards 420, 421 would connect directly to I/O bridge 407. Lastly, in certain embodiments, one or more components shown in FIG. 2 may be implemented as virtualized resources in a virtual computing environment, such as a cloud computing environment. In particular, parallel processing subsystem 412 can be implemented as a virtualized parallel processing subsystem in some embodiments. For example, parallel processing subsystem 412 may be implemented as a virtual graphics processing unit(s) (vGPU(s)) that renders graphics on a virtual machine(s) (VM(s)) executing on a server machine(s) whose GPU(s) and other physical resources are shared across one or more VMs.

Figure 5:
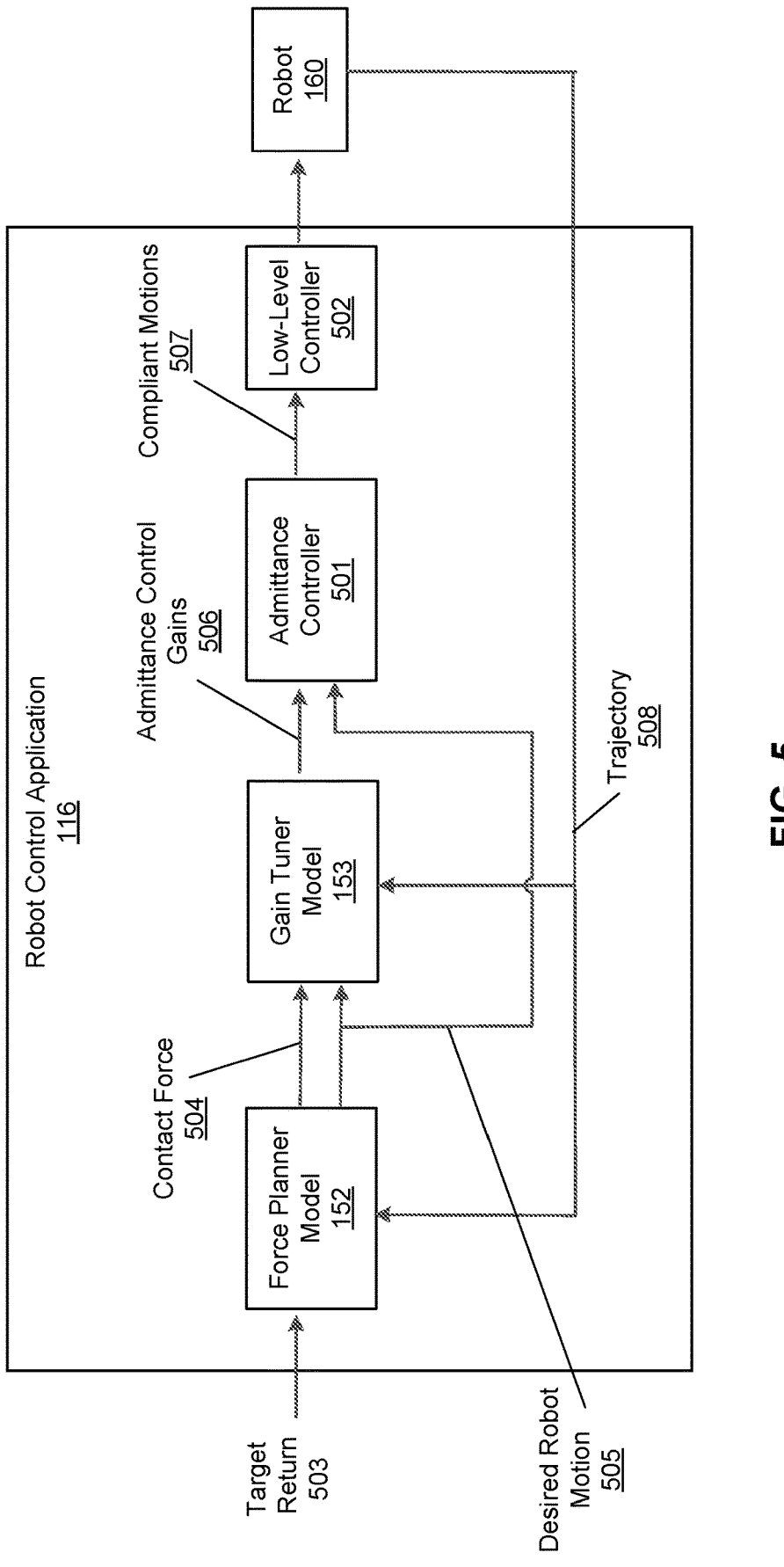
FIG. 5 is a more detailed illustration of the robot control application of FIG. 1, according to various embodiments.

FIG. 5 is a more detailed illustration of robot control application 116 of FIG. 1, according to various embodiments. As shown, robot control application 116 includes force planner model 152, gain tuner model 153, an admittance controller 501, and a low-level controller 502. In some embodiments, force planner model 152 and gain tuner model 153 can be trained offline, as described above in conjunction with FIG. 3.

Robot control application 116 inputs a target return 503, denoted herein by R, and a previous trajectory 508 into force planner model 152. Target return 503 can represent the intended outcome or goal of a robot task, such as achieving a specific position, orientation, force application, and/or the like. For example, target return 503 can be defined as $r=-\|x_{pos}-x_d\|_2$, where $x_d$ is a target point and $x_{pos}$ is a current robot position. Previous trajectory 508 can include previous robot motions and sensed forces, such as robot motions and forces sensed by a force sensor (e.g., on a robot wrist) included in the sensor(s) 180 within a window of previous time steps. Given such inputs, force planner model 152 generates a contact force 504 and a desired robot motion 505.

Robot control application 116 further inputs desired robot motion 505, contact force 504, and previous trajectory 508 into gain tuner model 153. Gain tuner model 153 processes desired robot motion 505, contact force 504, and previous trajectory 508 to generate admittance control gains 506, denoted herein by K. Higher values of admittance control gains 506 allow more motion in response to force errors, leading to a more compliant behavior.

Admittance controller 501 receives admittance control gains 506, K, and desired robot motion 505, denoted herein by $x_d$, $\dot{x}_d$, and admittance controller 501 generates compliant motion 507, denoted herein by $x_c$, $\dot{x}_c$. Given desired robot motion 505, admittance controller 501 generates compliant motion 507 $x_c$, $\dot{x}_c$ according to the mass-spring-damping dynamics model driven by the external force f:

$$M(\ddot{x}_c - \ddot{x}_d) + D(\dot{x}_c - \dot{x}_d) + K(x_c - x_d) = f. \tag{5}$$

In some embodiments, the force f is measured by force sensors, which provides real-time feedback on the force that the robot is currently applying to the environment. The admittance controller 501 operates by analyzing the force f and desired robot motion 505 and applying the admittance gains K to generate a compliant motion 507, denoted herein by $x_c$, $\dot{x}_c$. Although described herein primarily with respect to admittance controller 501 as a reference example, techniques disclosed herein can be used with any technically feasible controllers in some embodiments, such as controllers that directly control the position and orientation of a robot without feedback.

Low-level controller 502 tracks compliant motions 507. Low-level controller 502 directly interfaces with actuators on robot 160. In some embodiments, the primary functions of low-level controller 502 include, but are not limited to, motion control, trajectory tracking, and ensuring that the robot adheres to the prescribed compliant behavior. In some embodiments, low-level controller 502 processes compliant motion 507—for example, the desired positions, velocities, and accelerations—and ensures that compliant motion 507 is accurately followed by the joints or actuators of robot 160 by translating compliant motion 507 into specific motor or actuator inputs. In some embodiments, low-level controller 502 uses feedback mechanisms, such as proportional-integral-derivative (PID) control, to continuously adjust actuators of robot 160 in response to any deviations from the intended desired motion 505. In some embodiments, low-level controller 502 uses sensor feedback, such as encoders, resolvers, and/or the like, on the joints of robot 160, to measure the actual position and velocity and compares to the desired state. In some embodiments, when discrepancies arise between the commanded and actual motions—for example, due to factors such as mechanical play, backlash, or external disturbances-low-level controller 502 corrects the errors to achieve precise alignment with the planned compliant motion 507.

Figure 6:
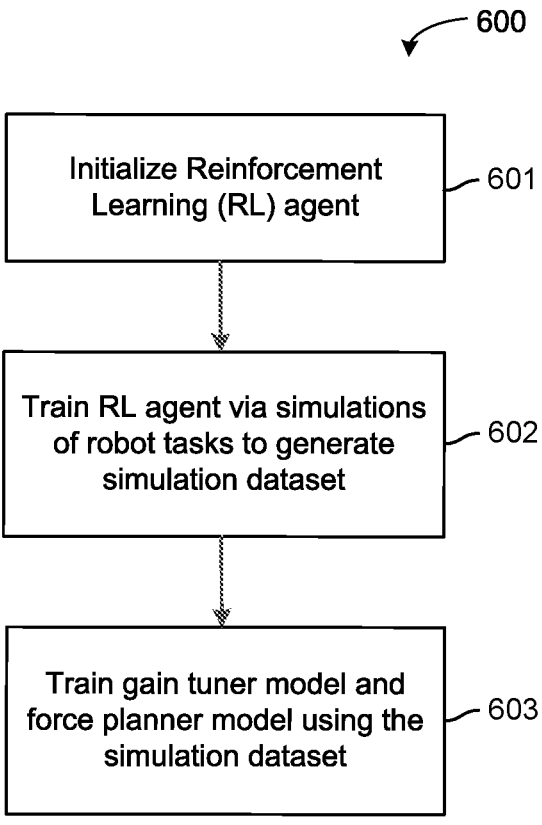
FIG. 6 is a flow diagram of method steps for training machine learning models to control a robot, according to various embodiments.

FIG. 6 is a flow diagram of method steps for training machine learning models to control a robot, according to various embodiments. Although the method steps are described in conjunction with FIGS. 1-5, persons skilled in the art will understand that any system configured to perform the method steps, in any order, falls within the scope of the present invention.

As shown, a method 600 begins at step 601, where model trainer 115 initializes a reinforcement learning agent. As described, data collection module 301 uses reinforcement learning to collect a simulation dataset associated with various robot interactions within simulation environment 305. To initialize the reinforcement learning agent, model trainer 115 sets a series of parameters that define how the reinforcement learning agent will interact with simulation environment 305. The parameters can include, but are not limited to, the initial state of a robot, which can specify the starting position, orientation, and velocity of the robot; initial conditions of an environment, such as the position of objects the robot will interact with; and/or the like. Further, policy parameters of the reinforcement learning agent are initialized, including but not limited to the learning rate, which determines how quickly the reinforcement learning agent adapts to new information; the discount factor, which balances the importance of immediate versus future rewards; and the exploration rate, which dictates how often the reinforcement learning agent will try novel actions outside of the current policy to discover potentially better strategies. Model trainer 115 also uses a reward/loss function to guide the learning process. The reward/loss function quantifies the success of actions by the reinforcement learning agent based on desired outcomes, such as the distance to a goal pose, the precision of an insertion task, the speed of execution, and/or the like. Moreover, model trainer 115 configures the reinforcement learning agent with specific architectural details, such as a number of layers in a neural network, the number of neurons in each layer, activation functions, and/or the like, which influences how the policy of the reinforcement learning agent is represented and optimized. Step 601 can also include setting up a simulation replay buffer, where experiences (e.g., state, action, reward, new state) are stored. The replay buffer becomes a valuable dataset from which the reinforcement learning agent can learn, allowing diverse experiences to be sampled during training and avoid overfitting to a narrow set of scenarios.

At step 602, model trainer 115 trains the reinforcement learning agent via simulations of robot tasks to generate a simulation dataset. As described, the simulation dataset can include robot states and motions, previous admittance gains, desired forces, robot trajectories during simulations, and whether a robot successfully performed one or more tasks in simulation. In some embodiments, reinforcement learning module 304 can perform any technically feasible reinforcement learning technique, such as the Soft-Actor-Critic algorithm technique, and/or the like, to train the reinforcement learning agent to control a robot to perform one or more tasks. In some embodiments, initial training is conducted with tasks that have a larger margin for error, which establishes a foundational strategy for the reinforcement learning agent. The baseline is used for scaling up to more complex tasks, such as precise insertions with minimal clearance, which can closely resemble challenging conditions a robot will face in a real-world environment. Reinforcement learning module 304 progressively refines the ability of the reinforcement learning agent to control the robot to execute tasks with high precision, reflecting the intricacies and demands of real-world tasks. Reinforcement learning module 304 performs physical simulations within simulation environment 305 to train the reinforcement learning agent and create the simulation dataset. For example, simulation environment 305 could use the PhysX engine to accurately model the dynamics of a robotic arm navigating a peg-and-hole assembly task, where the peg and hole both have a certain dimension (e.g., 40 mm). In such a case, to infuse a sense of real-world unpredictability and complexity into the simulations, simulation environment 305 can include domain randomization to alter the starting position and orientation of the peg and/or modify the location of the hole, effectively simulating the variations a robot could encounter in different manufacturing settings; data augmentation which can be applied to the force exerted by the robot during the insertion task, adjusting the force with a scaling factor that can span a range (e.g., from 0.4 to 1.4), thereby capturing the spectrum of force feedback the robot could encounter due to material differences or equipment wear; and/or the like. In some embodiments, to replicate the kind of sensor noise that robots face in industrial settings, simulation environment 305 injects zero-mean Gaussian noise, with a standard deviation of one Newton, into force measurements. Data from the simulations within simulation environment 305 during reinforcement learning, which can include various aspects of robot operation such as robot position, movement speed, planned motion increments, and anticipated interaction forces, and whether the robot successfully performed one or more tasks, can be stored in simulation data storage 302 as the simulation dataset.

At step 603, model trainer 115 trains force planner model 152 and gain tuner model 153 using the simulation dataset. In some embodiments, model trainer 115 can train force planner model 152 and gain tuner model 153 according to the techniques described above in conjunction with FIG. 3. As described, force planner model 152 is trained to receive as input a desired return and a historical trajectory of robot movements, and force planner model 152 is trained to output a next step in the robot sequence of actions and an associated contact force. Further, gain tuner model 153 is trained to receive as input the historical trajectory and the next step and associated contact force that are output by the force planner model 152, and gain tuner model 153 is trained to output compliance gains (e.g., admittance control gains) that help ensure the contact force applied by a robot aligns with the contact force predicted by the force planner model 152. Model trainer 115 can perform any technically feasible supervised learning technique, such as backpropagation with gradient descent or a variation thereof, to train each of the force planner model 152 and the gain tuner model 153. Further, any suitable loss function can be used during the training of force planner model 152 and gain tuner model 153. For example, in some embodiments, a mean-squared error loss function can be used to help ensure that the future movements of the robot and the forces that the robot applies are in line with what has been learned from past successful interactions in the simulated dataset from simulation data storage 302. Although described herein primary with respect to training force planner model 152 and gain tuner model 153 using a simulation dataset, in some embodiments, force planner model 152 and gain tuner model 153 can further be trained and/or fine tuned using real-world data, such as data that is collected after the trained force planner model 152 and gain tuner 153 are deployed to control a robot.

FIG. 7 is a flow diagram of method steps for using trained machine learning models to control a robot, according to various embodiments. Although the method steps are described in conjunction with FIGS. 1-5, persons skilled in the art will understand that any system configured to perform the method steps, in any order, falls within the scope of the present invention.

As shown, a method 700 begins with step 701, where robot control application 116 inputs target return 503 and previous robot trajectory 508 into force planner model 152. As described, target return 503 can represent the intended outcome or goal of a robot task, such as achieving a specific position, orientation, force application, and/or the like. For example, target return 503 could include positioning a component precisely within an assembly or applying a certain level of pressure during a manufacturing process. Previous robot trajectory 508 can include a recent history (e.g., within a given time window) of robot movements and sensed forces (e.g., forces sensed by a force sensor on a robot wrist). Robot trajectory 508 provides context by detailing how the robot has navigated and interacted with the environment in the immediate past, such as robot positions, velocities, forces exerted during the interactions, and/or the like. The historical data is used by the force planner model 152 to understand the current state of the robot and the environment, enabling force planner model 152 to predict adjustments in motion and force to achieve the target return 503.

At step 702, robot control application 116 processes target return 503 and previous robot trajectory 508 using force planner model 152 to generate desired robot motion 505 and associated force 504. Given target return 503 and previous robot trajectory 508, force planner model 152 outputs desired robot motion 505 and desired force 504, as described above in conjunction with FIG. 5.

At step 703, robot control application 116 processes desired robot motion 505, associated contact force 504, and robot trajectory 508 using trained gain tuner model 153 to generate admittance control gains 506. Given desired robot motion 505 and associated contact force 504, gain tuner model 153 outputs admittance control gains 506, as described above in conjunction with FIG. 5. As described, admittance control gains 506 can enable compliance and responsiveness to force feedback. The admittance control gains 506 effectively dictate how the robot responds to discrepancies between the actual and predicted forces, allowing for precise and controlled movements. Accordingly, robot actions can be finely tuned for executing various tasks, including high-precision tasks, while balancing accuracy and compliance with the dynamic conditions of a real-world environment.

At step 704, admittance controller 501 generates compliant motions 507 based on the admittance control gains 506. Admittance controller 501 uses the admittance control gains 506 to modulate robot movements so that the movements align with desired robot motion 505. Compliant motions 507 are the actual, real-time movements that the robot executes, and compliant motions 507 are directly influenced by admittance control gains 506. Admittance control gains 506 affect the level of compliance and flexibility in robot motions, particularly when interacting with external forces or objects. For example, in a scenario where a robot is required to insert a component with a snug fit, admittance controller 501 could just a path and speed of the robot to accommodate any resistance encountered, thereby avoiding excessive force that could cause damage. Conversely, in tasks requiring a firmer approach, such as pressing components together, admittance controller 501 could reduce the compliance to ensure the necessary force is applied.

At step 705, low-level controller 502 generates low-level robot motion commands based on the compliant motions 507. Any technically feasible low-level robot motion commands can be generated, depending on the particular robot being controlled. Low-level controller 502 generates low-level robot motion commands, effectively tracking and implementing the compliant motions 507 as directed by the admittance controller 501.

At step 706, robot control application 116 causes robot 160 to be controlled using the low-level robot motion commands. In some embodiments, low-level controller 502 interfaces with the actuators on robot 160 responsible for motion control, trajectory tracking, ensuring adherence to the prescribed compliant behavior, and/or the like. For example, each compliant motion 507, which can include desired positions, velocities, and accelerations, can be translated into specific motor or actuator inputs that the physical components of the robot can execute. In some embodiments, the low-level controller 502 uses feedback mechanisms, such as PID control, to make continuous adjustments to the robot actuators in response to any deviations from the intended compliant motion 507. In some embodiments, low-level controller 502 uses sensor feedback, such as encoders or resolvers on robot joints, to measure the actual position and velocity and compare the measurements with the desired state, thereby ensuring high fidelity in motion execution. Further, in some embodiments, low-level controller 502 is equipped to address and correct any discrepancies between the commanded and actual motions due to mechanical factors, such as play or backlash in the robot joints or external disturbances affecting the robot operation.

In sum, techniques are disclosed for controlling a robot using a force planner model and a gain tuner model. The force planner model is a machine learning model that (1) receives as inputs a return indicating an end goal of a task and a previous robot trajectory, and (2) generates a next robot motion and associated contact force. The gain tuner model is another machine learning model that (1) receives as inputs the previous robot trajectory and the robot motion and associated contact force from the force planner model, and (2) predicts compliance gains (e.g., admittance control gains) for the robot to maintain the correct force application when performing a task. To train the force planner model and the gain tuner model, a model trainer first generates a simulation dataset using reinforcement learning within a simulated environment that includes domain randomization to replicate the variability in real-world environments. The simulation dataset can include robot states and motions, previous admittance gains, desired forces, and robot trajectories during simulations. Using the simulation dataset, the model trainer concurrently trains (1) the force planner model to predict robot motions and associated contact forces, and (2) the gain tuner model to predict admittance control gains. Subsequent to training, the force planner model and the gain tuner model can be deployed to control a robot within a real-world environment. During the deployment, the trained force planner model and the trained gain tuner model are used to generate robot motions and admittance control gains that are input into an admittance controller. In turn, the admittance controller generates compliant motions that can be tracked by a low-level controller to control the robot.

At least one technical advantage of the disclosed techniques relative to the prior art is that the disclosed techniques train, using simulation data, machine learning models that can correctly control physical robots in real-world environments. In particular, the trained machine learning models can control physical robots to perform high-precision tasks more successfully relative to conventional machine learning models and deterministic algorithms. For example, a machine learning model that is trained according to techniques disclosed herein can control a robot to complete an insertion task, while being robust to variations in object shape, material, and position. In addition, the disclosed techniques do not require the machine learning models to be trained using very precise simulations of physical interactions that are prohibitively computationally expensive or time consuming. These technical advantages represent one or more technological improvements over prior art approaches.

1. In some embodiments, a computer-implemented method for controlling a robot comprises generating, via a first trained machine learning model, a robot motion and a predicted force associated with the robot motion, determining, via a second trained machine learning model, a gain associated with the predicted force, generating one or more robot commands based on the robot motion and the gain, and causing a robot to move based on the one or more robot commands.

2. The computer-implemented method of clause 1, wherein generating the one or more robot commands comprises performing one or more admittance control operations based on the robot motion, the gain, and a sensed force.

3. The computer-implemented method of clauses 1 or 2, wherein the one or more admittance control operations generate one or more complaint motions, and the method further includes generating the one or more robot commands based on the one or more complaint motions.

4. The computer-implemented method of any of clauses 1-3, wherein generating the robot motion and the predicted force comprises inputting a previous robot trajectory and a target return into the first trained machine learning model that outputs the robot motion and the predicted force.

5. The computer-implemented method of any of clauses 1-4, wherein determining the gain comprises inputting the robot motion, the predicted force, and a previous robot trajectory into the second trained machine learning model that outputs the gain.

6. The computer-implemented method of any of clauses 1-5, further comprising performing one or more operations to generate simulation data during training of a reinforcement learning model based on one or more simulations of the robot within a virtual environment, and performing one or more operations to train a first machine learning model based on the simulation data to generate the first trained machine learning model, and performing one or more operations to train a second machine learning model based on the simulation data to generate the second trained machine learning model.

7. The computer-implemented method of any of clauses 1-6, wherein the simulation data includes at least one of robot state data, robot motion data, gain data, force data, or data indicating whether the robot successfully performed one or more tasks within the virtual environment.

8. The computer-implemented method of any of clauses 1-7, wherein the first machine learning model and the second machine learning model are trained based on a mean squared error loss.

9. The computer-implemented method of any of clauses 1-8, wherein the predicted force is a contact force, and the gain is a compliance gain.

10. The computer-implemented method of any of clauses 1-9, wherein each of the first trained machine learning model and the second trained machine learning model comprises a transformer model.

11. In some embodiments, one or more non-transitory computer-readable media store instructions that, when executed by at least one processor, cause the at least one processor to perform the steps of generating, via a first trained machine learning model, a robot motion and a predicted force associated with the robot motion, determining, via a second trained machine learning model, a gain associated with the predicted force, generating one or more robot commands based on the robot motion and the gain, and causing a robot to move based on the one or more robot commands.

12. The one or more non-transitory computer-readable media of clause 11, wherein generating the one or more robot commands comprises performing one or more admittance control operations based on the robot motion, the gain, and a sensed force.

13. The one or more non-transitory computer-readable media of clauses 11 or 12, wherein the one or more admittance control operations generate one or more complaint motions, and the instructions, when executed by the at least one processor, further cause the at least one processor to perform the step of generating the one or more robot commands based on the one or more complaint motions.

14. The one or more non-transitory computer-readable media of any of clauses 11-13, wherein generating the robot motion and the predicted force comprises inputting a robot trajectory associated with one or more previous time steps and a target return into the first trained machine learning model that outputs the robot motion and the predicted force.

15. The one or more non-transitory computer-readable media of any of clauses 11-14, wherein determining the gain comprises inputting the robot motion, the predicted force, and a robot trajectory associated with one or more previous time steps into the second trained machine learning model that outputs the gain.

16. The one or more non-transitory computer-readable media of any of clauses 11-15, wherein the instructions, when executed by the at least one processor, further cause the at least one processor to perform the steps of performing one or more operations to generate simulation data during training of a reinforcement learning model based on one or more simulations of the robot within a virtual environment, and performing one or more operations to train a first machine learning model based on the simulation data to generate the first trained machine learning model, and performing one or more operations to train a second machine learning model based on the simulation data to generate the second trained machine learning model.

17. The one or more non-transitory computer-readable media of any of clauses 11-16, wherein the simulation data includes at least one of robot state data, robot motion data, gain data, force data, or data indicating whether the robot successfully performed one or more tasks within the virtual environment.

18. The one or more non-transitory computer-readable media of any of clauses 11-17, wherein each of the one or more operations to train the first machine learning model and the one or more operations to train the second machine learning model include one or more supervised learning operations.

19. The one or more non-transitory computer-readable media of any of clauses 11-18, wherein the robot motion includes at least one of a change in position or a change in orientation.

20. In some embodiments, a system comprises one or more memories storing instructions, and one or more processors that are coupled to the one or more memories and, when executing the instructions, are configured to generate, via a first trained machine learning model, a robot motion and a predicted force associated with the robot motion, determine, via a second trained machine learning model, a gain associated with the predicted force, generate one or more robot commands based on the robot motion and the gain, and cause a robot to move based on the one or more robot commands.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for controlling a robot, the method comprising:
   inputting a target return and a previous robot trajectory into a first trained machine learning model that outputs a robot motion and a predicted force associated with the robot motion, wherein the previous robot trajectory comprises previous robot motions and forces sensed by a force sensor;
   inputting the robot motion, the predicted force, and the previous robot trajectory into a second trained machine learning model that outputs an admittance gain associated with the predicted force;
   generating one or more robot commands based on the robot motion and the admittance gain; and
   causing the robot to move based on the one or more robot commands.

2. The computer-implemented method of claim 1, wherein generating the one or more robot commands comprises performing one or more admittance control operations based on the robot motion, the admittance gain, and a sensed force.

3. The computer-implemented method of claim 2, wherein the one or more admittance control operations generate one or more complaint motions, and the method further includes generating the one or more robot commands based on the one or more complaint motions.

4. The computer-implemented method of claim 1, further comprising:
   performing one or more operations to generate simulation data during training of a reinforcement learning model based on one or more simulations of the robot within a virtual environment;
   performing one or more operations to train a first machine learning model based on the simulation data to generate the first trained machine learning model; and
   performing one or more operations to train a second machine learning model based on the simulation data to generate the second trained machine learning model.

5. The computer-implemented method of claim 4, wherein the simulation data includes at least one of robot state data, robot motion data, admittance gain data, force data, or data indicating whether the robot successfully performed one or more tasks within the virtual environment.

6. The computer-implemented method of claim 4, wherein the first machine learning model and the second machine learning model are trained based on a mean squared error loss.

7. The computer-implemented method of claim 1, wherein the predicted force is a contact force, and the admittance gain is a compliance gain.

8. The computer-implemented method of claim 1, wherein each of the first trained machine learning model and the second trained machine learning model comprises a transformer model.

9. One or more non-transitory computer-readable media storing instructions that, when executed by at least one processor, cause the at least one processor to perform the steps of:

inputting a target return and a previous robot trajectory into a first trained machine learning model that outputs a robot motion and a predicted force associated with the robot motion, wherein the previous robot trajectory comprises previous robot motions and forces sensed by a force sensor;

inputting the robot motion, the predicted force, and the previous robot trajectory into a second trained machine learning model that outputs an admittance gain associated with the predicted force;

generating one or more robot commands based on the robot motion and the admittance gain; and causing a robot to move based on the one or more robot commands.

10. The one or more non-transitory computer-readable media of claim 9, wherein generating the one or more robot commands comprises performing one or more admittance control operations based on the robot motion, the admittance gain, and a sensed force.

11. The one or more non-transitory computer-readable media of claim 10, wherein the one or more admittance control operations generate one or more complaint motions, and the instructions, when executed by the at least one processor, further cause the at least one processor to perform the step of generating the one or more robot commands based on the one or more complaint motions.

12. The one or more non-transitory computer-readable media of claim 9, wherein the instructions, when executed by the at least one processor, further cause the at least one processor to perform the steps of:

performing one or more operations to generate simulation data during training of a reinforcement learning model based on one or more simulations of the robot within a virtual environment;

performing one or more operations to train a first machine learning model based on the simulation data to generate the first trained machine learning model; and performing one or more operations to train a second machine learning model based on the simulation data to generate the second trained machine learning model.

13. The one or more non-transitory computer-readable media of claim 12, wherein the simulation data includes at least one of robot state data, robot motion data, admittance gain data, force data, or data indicating whether the robot successfully performed one or more tasks within the virtual environment.

14. The one or more non-transitory computer-readable media of claim 12, wherein each of the one or more operations to train the first machine learning model and the one or more operations to train the second machine learning model include one or more supervised learning operations.

15. The one or more non-transitory computer-readable media of claim 9, wherein the robot motion includes at least one of a change in position or a change in orientation.

16. A system, comprising:

one or more memories storing instructions; and one or more processors that are coupled to the one or more memories and, when executing the instructions, are configured to:

input a target return and a previous robot trajectory into a first trained machine learning model that outputs a robot motion and a predicted force associated with the robot motion, wherein the previous robot trajectory comprises previous robot motions and forces sensed by a force sensor, input the robot motion, the predicted force, and the previous robot trajectory into a second machine learning model that outputs an admittance gain associated with the predicted force, generate one or more robot commands based on the robot motion and the admittance gain, and cause a robot to move based on the one or more robot commands.

17. The computer-implemented method of claim 4, wherein the first machine learning model and the second machine learning model are trained concurrently.

18. The computer-implemented method of claim 1, wherein:

causing the robot to move based on the one or more robot commands comprises inputting the admittance gain and the predicted force into an admittance controller that generates one or more compliant motions, and the one or more robot commands are based on the one or more compliant motions.

19. The one or more non-transitory computer-readable media of claim 9, wherein the first trained machine learning model and the second trained machine learning model are trained concurrently.

20. The one or more non-transitory computer-readable media of claim 9, wherein:

causing the robot to move based on the one or more robot commands comprises inputting the admittance gain and the predicted force into an admittance controller that generates one or more compliant motions, and the one or more robot commands are based on the one or more compliant motions.

* * * * *